(12) United States Patent
Ichinose

(10) Patent No.: US 12,416,782 B2
(45) Date of Patent: Sep. 16, 2025

(54) CONTROL APPARATUS INCLUDING DRIVING UNIT, LENS APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Masami Ichinose, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 176 days.

(21) Appl. No.: 18/353,335

(22) Filed: Jul. 17, 2023

(65) Prior Publication Data
US 2024/0061210 A1 Feb. 22, 2024

(30) Foreign Application Priority Data
Aug. 16, 2022 (JP) .................... 2022-129454

(51) Int. Cl.
*G02B 7/36* (2021.01)
*H02P 7/025* (2016.01)
*H02P 7/29* (2016.01)
*H04N 23/54* (2023.01)
*H04N 23/65* (2023.01)

(52) U.S. Cl.
CPC ............ *G02B 7/36* (2013.01); *H02P 7/025* (2016.02); *H02P 7/29* (2013.01); *H04N 23/54* (2023.01); *H04N 23/651* (2023.01)

(58) Field of Classification Search
CPC ... G02B 7/36; H02P 7/025; H02P 7/29; H02P 25/034; H04N 23/54; H04N 23/651; H04N 23/65; H04N 23/6812; H04N 23/687
See application file for complete search history.

(56) References Cited

U.S. PATENT DOCUMENTS

| 2008/0191649 A1* | 8/2008 | Fischer ............... H02P 25/06 318/135 |
| 2015/0334310 A1* | 11/2015 | Tanaka .............. H04N 23/69 348/169 |
| 2018/0278850 A1* | 9/2018 | Kim ................. H04N 23/57 |
| 2019/0086633 A1* | 3/2019 | Kim ................ H04N 23/6812 |

FOREIGN PATENT DOCUMENTS

JP 2003149525 A 5/2003

* cited by examiner

*Primary Examiner* — Gevell V Selby
(74) *Attorney, Agent, or Firm* — ROSSI, KIMMS & McDOWELL LLP

(57) ABSTRACT

A control apparatus for a camera system that includes an image pickup apparatus and a lens apparatus including a driven unit, an output unit that is supplied with power from the image pickup apparatus, an actuator configured to move the driven unit includes a driving unit configured to drive the actuator by a PWM output method or a linear output method using the power from the output unit, and a control unit configured to control an output of the power from the output unit to the driven unit. The control unit causes the output unit to output a first power in a case where the driving unit drives the actuator by the PWM output method, and in a case where the driving unit drives the actuator by the linear output method, the control unit causes the output unit to output a second power different from the first power.

8 Claims, 6 Drawing Sheets

CONTROL APPARATUS INCLUDING DRIVING UNIT, LENS APPARATUS, IMAGE PICKUP APPARATUS, CONTROL METHOD, AND STORAGE MEDIUM

BACKGROUND

Technical Field

One of the aspects of the embodiments relates to a control apparatus, a lens apparatus, an image pickup apparatus, a control method, and a storage medium.

Description of Related Art

The number of pixels and the sensitivity of an image sensor have recently been increased in an image pickup apparatus, and the influence of noise generated by a pulse width modulation (PWM) control for controlling an actuator has become remarkable.

Japanese Patent Laid-Open No. 2003-149525 discloses a configuration for controlling an actuator by an amplifier output method that does not generate noise.

However, the power efficiency of the amplifier output method is lower than that of PWM control, and thus the number of images is reduced in the configuration of Japanese Patent Laid-Open No. 2003-149525.

SUMMARY

A control apparatus according to one aspect of the embodiment is used for a camera system that includes an image pickup apparatus and a lens apparatus including a driven unit, an output unit that is supplied with power from the image pickup apparatus and outputs power that is used to move the driven unit, and an actuator configured to move the driven unit. The control apparatus includes a driving unit configured to drive the actuator by a PWM output method or a linear output method using the power from the output unit, and a control unit configured to control an output of the power from the output unit to the driven unit. The control unit causes the output unit to output a first power in a case where the driving unit drives the actuator by the PWM output method, and in a case where the driving unit drives the actuator by the linear output method, the control unit causes the output unit to output a second power different from the first power. A lens apparatus and an image pickup apparatus each having the above control apparatus, a control method corresponding to the above control apparatus, a storage medium storing a program that causes a computer to execute the above control method also constitute another aspect of the disclosure.

Further features of the disclosure will become apparent from the following description of embodiments with reference to the attached drawings.

DESCRIPTION OF THE EMBODIMENTS

Figure 1:
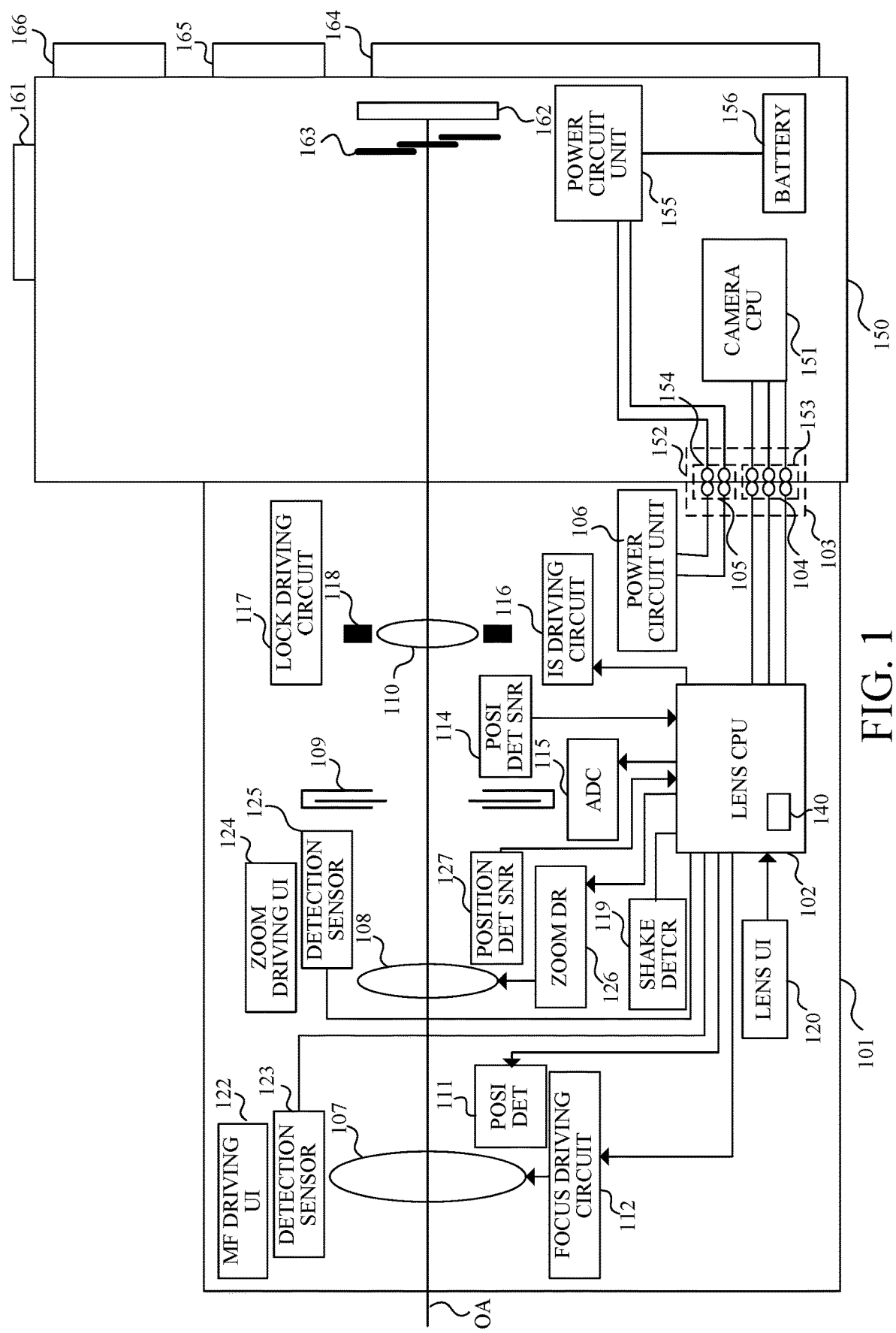
FIG. 1 is a block diagram of a camera system according to one embodiment of the disclosure.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

FIG. 1 is a block diagram of a lens interchangeable type single-lens digital camera system, which is an example of a camera system (optical apparatus) 100 according to one embodiment of the present disclosure. The camera system 100 includes a camera body (image pickup apparatus) 150 and an interchangeable lens (lens apparatus) 101 attachable to and detachable from the camera body 150. However, the present disclosure is not limited to this example, and can also be applied to a camera system 100 in which an image pickup apparatus and a lens apparatus are integrated with each other. In the camera system 100 in which the image pickup apparatus and the lens apparatus are integrated, the camera CPU has a function of the lens CPU.

In the camera system 100, the camera body 150 and the interchangeable lens 101 are connected via a communication terminal (communication contact portion) 153 in a camera-side contact portion 152 and a communication terminal (communication contact portion) 104 in a lens-side contact portion 103 so that they can communicate information with each other. (Electric) power is supplied from a power circuit unit 155 in the camera body 150 to a power circuit unit (output unit) 106 of the interchangeable lens 101 via a power contact portion 154 in the camera-side contact portion 152 and a power contact portion 105 in the lens-side contact portion 103. The power circuit unit 155 generates various power sources used in the camera body 150 or power sources to be supplied to the interchangeable lens 101 from a battery 156 attached to the camera body 150 using a Low Dropout (LDO) (linear regulator) or a DC-DC circuit.

A lens CPU 102 as a lens controller provided in the interchangeable lens 101 stores characteristic information and optical information unique to the interchangeable lens 101 in an internal memory 140. The lens CPU 102 stores in the internal memory 140 a set value to be output to a driver IC provided in each of a focus lens driving circuit 112, a zoom lens driving circuit 126, an aperture driving circuit 115, and an image stabilization (IS) driving circuit 116. However, the present disclosure is not limited to this example, and the set values may be stored in a memory provided separately from the lens CPU 102. The lens CPU 102 transmits the characteristic information and the optical information to a camera CPU 151 as a camera controller provided inside the camera body 150 via the communication terminals 104 and 153.

The characteristic information includes a name of the interchangeable lens 101 (ID information for identifying the model), a maximum communication speed, maximum F-number, whether it is a zoom lens or not, a compatible autofocus (AF) system, and an image height capable of AF. The characteristic information further includes information about table data indicating a relationship between an F-number and a T-number. The optical information includes sensitivity information about the focus lens 107 obtained by a matrix of a position of a focus lens 107, a position of a zoom lens (magnification varying lens) 108, and a state of an aperture stop 109, a focus correction amount (designed value), a focus correction manufacturing error value.

A permission signal or the like for permitting movement of the focus lens 107 by operating a manual focus (MF) driving user interface (UI) 122 provided in the interchangeable lens 101 is also transmitted from the camera CPU 151 to the lens CPU 102. The interchangeable lens 101 and the camera body 150 exchange information such as other operation states, setting states, various information request commands (transmission requests), and driving commands via the communication terminals 104 and 153.

The interchangeable lens 101 includes a lens UI 120 such as a switch for selecting AF or MF in the focusing operation. The state of the lens UI 120 is also exchanged via the communication terminals 104 and 153.

The interchangeable lens 101 includes an optical system (imaging optical system) including the focus lens 107, the zoom lens 108, the aperture stop 109, and an image stabilizing lens 110. The zoom lens 108 and focus lens 107 are each movable in a direction along an optical axis OA (optical axis direction). The image stabilizing lens 110 is movable in a direction intersecting the optical axis OA. A light beam from an object formed via the imaging optical system is guided to an image sensor 162 provided within the camera body 150. As a method for detecting the focus state, the image sensor 162 can output a phase difference signal and an image signal at the same time if including a structure in which one pixel has a plurality of photoelectric conversion units.

In a case where the camera CPU 151 confirms that AF is selected by the AF/MF selection switch included in the lens UI 120, it starts AF operation. The camera CPU 151 processes the output from the image sensor 162, detect the focus state of the imaging optical system, combines it with the above optical information of the interchangeable lens 101, and determines a moving amount of the focus lens 107 to obtain an in-focus state for the object.

The camera CPU 151 transmits the calculated focus lens moving amount to the lens CPU 102 via the communication terminals 104 and 153. The lens CPU 102 controls the focus lens driving circuit 112 in accordance with focus lens position information from a position sensor 111 that detects the position of the focus lens 107 and the received moving amount of the focus lens 107. Thereby, the focus lens 107 can be moved to the in-focus position.

The user can operate the MF driving UI 122 including a cylindrical manual focus ring that rotates around the optical axis OA and is mounted on the exterior of the interchangeable lens 101. A detection sensor 123 detects an operation amount of the MF driving UI 122 by the user. The lens CPU 102 controls the focus lens driving circuit 112 according to the operation amount of the MF driving UI 122 to move the focus lens 107 to a predetermined position. In a case where the camera CPU 151 confirms that MF is selected by the AF/MF selection switch, the camera CPU 151 performs focusing by moving the focus lens 107 to a predetermined position according to the user operation of the MF driving UI 122 without performing the AF operation.

A user can operate a zoom driving UI 124. The zoom driving UI is, for example, a cylindrical manual zoom ring mounted on the exterior of the interchangeable lens 101 rotatably around the optical axis OA. A detection sensor 125 detects an operation amount of the zoom driving UI 124. The lens CPU 102 controls the zoom lens driving circuit 126 based on the operation amount of the zoom driving UI 124 and the detection signal of the position detection sensor 127 that detects the position of the zoom lens 108, and moves the zoom lens 108 to a predetermined position. The zoom driving UI may be provided on the camera body 150.

The camera CPU 151 determines the result of photometry by a photometry sensor (not illustrated) based on a half-press operation of a release switch included in a camera UI (camera user interface) 161 provided on the camera body 150. The camera CPU 151 determines an F-number (aperture value) set by operating an operation unit included in the camera UI 161.

The camera CPU 151 transmits an F-number set for the aperture stop 109 to the lens CPU 102 via the communication terminals 104 and 153. The lens CPU 102 moves the aperture stop 109 (controls the aperture of the aperture stop 109) by controlling the aperture driving circuit 115 according to the received F-number and aperture stop position information based on a position sensor 114 that detects the position of the aperture stop 109.

The camera CPU 151 transmits an image stabilization start command to the lens CPU 102 via the communication terminals 104 and 153 in response to the half-pressing operation of the release switch. Upon receiving the image stabilization start command, the lens CPU 102 first controls the IS driving circuit 116 to hold the image stabilizing lens 110 at a control center position. Next, the lens CPU 102 controls a lock driving circuit 117 to drive a mechanical lock 118 to release a locked state. Thereafter, the lens CPU 102 controls the IS driving circuit 116 according to the detection result of the camera shake detecting circuit 119 to move the image stabilizing lens 110 for image stabilization.

The camera CPU 151 moves a main mirror (not illustrated) and the shutter 163 installed in front of the image sensor 162 according to the full-pressing operation of the release switch, guides a light beam from the imaging optical system to the image sensor 162, and captures an image. The image sensor 162 includes a photoelectric conversion element such as a CCD sensor or a CMOS sensor. The camera CPU 151 generates image data based on an output from the image sensor 162 and records it on a recording medium. In a case where a still image capturing mode is selected by a setting of a camera GUI unit including the display unit 164 and a camera UI 165, an image to be captured is a still image. In a case where a moving image capturing mode is selected by the setting of the camera GUI unit, an image to be captured is a moving image. Alternatively, a moving image recording start button may be separately provided, and a moving image recording may be started in a case where the recording start button is pressed. A user can check a captured image through an electronic viewfinder 166.

Figure 2:
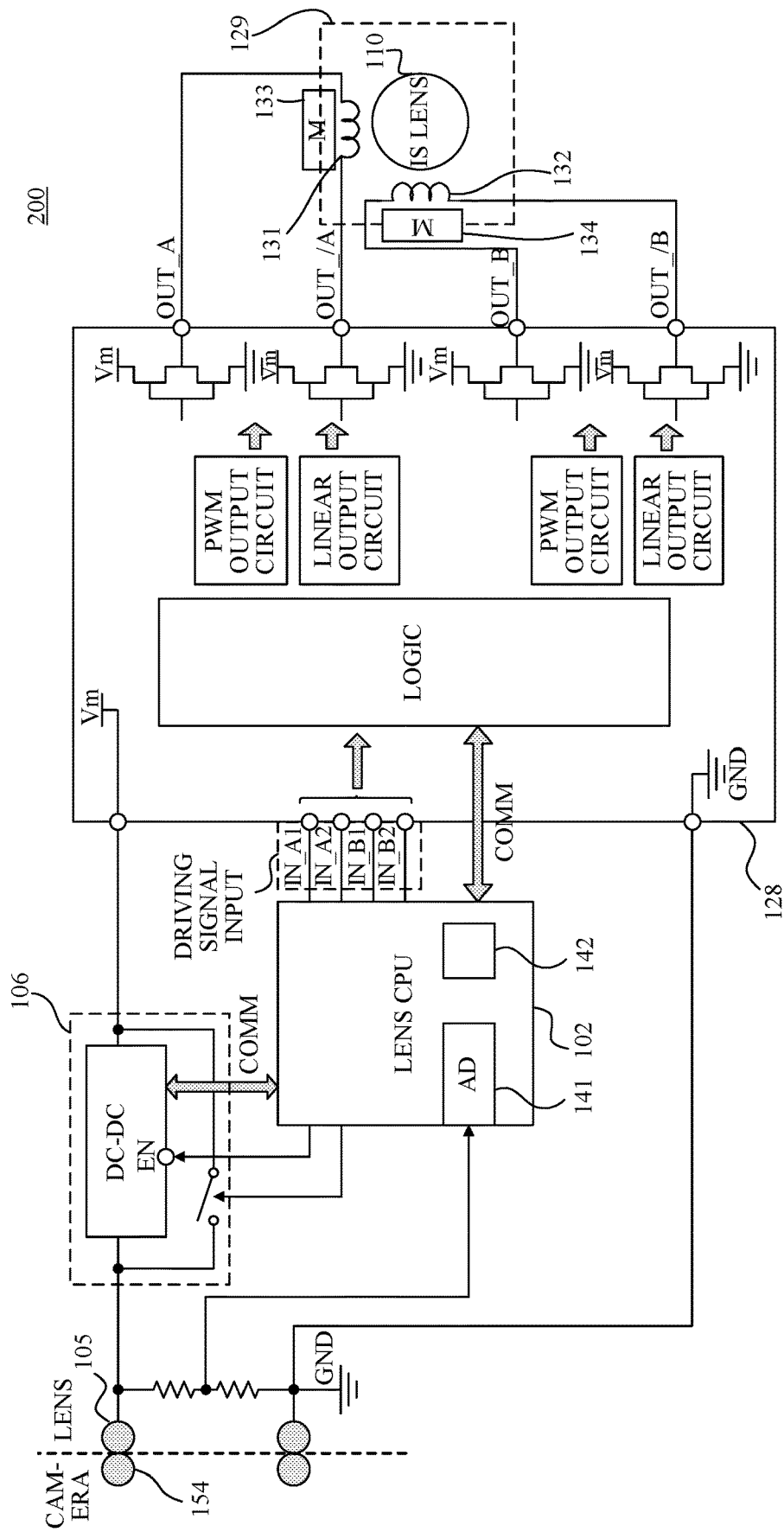
FIG. 2 is a detailed diagram of a control apparatus.

FIG. 2 is a detailed diagram of the control apparatus 200. The control apparatus 200 includes the lens CPU 102 and the IS driving circuit 116. The IS driving circuit 116 includes a driver IC (driving control unit) 128 and an actuator 129. In this embodiment, the image stabilizing lens 110 is moved as a driven unit, but this embodiment is not limited to this example. The driven unit in another embodiment may be, for example, the aperture stop 109 or the focus lens 107.

The actuator 129 includes moving coils 131 and 132 attached to the image stabilizing lens 110 and magnets (permanent magnets) 133 and 134 disposed to face the moving coils 131 and 132, respectively. The image stabilizing lens 110 is fixed together with the moving coils 131 and 132 to an unillustrated fixed frame. By applying a current to the moving coils 131 and 132, a driving force can be generated between the moving coils 131 and 132 and the magnets 133 and 134, and the image stabilizing lens 110 can be moved.

The driver IC 128 includes a PWM output circuit and a linear output circuit, and can switch the output method (PWM output method and linear output method) to the moving coils 131 and 132 by communication from the lens CPU 102. The output method may be switched by changing the setting of the terminal of the driver IC 128 from the lens CPU 102 instead of the communication from the lens CPU 102.

The power circuit unit 106 supplies power to the driver IC 128. The power circuit unit 106 outputs power (second power) in an output method in which a step-down DC-DC circuit that receives the power supplied from the power circuit unit 155 via the power contact portions 154 and 105 outputs the power. The power circuit unit 106 can output power (first power) in an output method in which the power supplied from the power circuit unit 155 via the power contact portions 154 and 105 is output as it is. An analog-to-digital (A/D) converter (detector) 141 of the lens CPU 102 detects a voltage level supplied from the power circuit unit 155 via voltage dividing resistors. The step-down DC-DC circuit can turn on and off the output and set the output voltage level by communication from the lens CPU 102 or terminal setting. The control unit 142 controls the output method of the power circuit unit 106. A step-up DCDC circuit or a step-up/step-down DCDC circuit may be used instead of the step-down DC-DC circuit.

Figure 3:
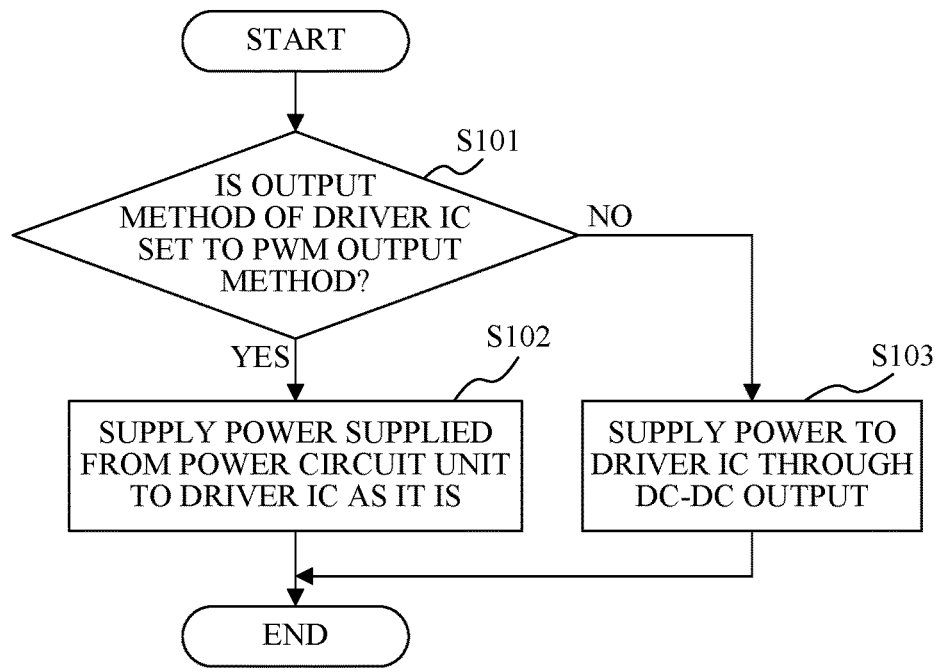
FIG. 3 is a flowchart illustrating an example of power setting processing.

The operation of the IS driving circuit 116 will be described below. FIG. 3 is a flowchart illustrating an example of power setting processing.

In step S101, the lens CPU 102 determines whether the output method of the driver IC 128 is set to the PWM output method. In a case where the lens CPU 102 determines that the PWM output method is set, the flow proceeds to step S102; otherwise (in a case where the linear output method is set), the flow proceeds to step S103.

In step S102, the lens CPU 102 causes the power circuit unit 106 to supply the power supplied from the power circuit unit 155 to the driver IC 128 as it is.

In step S103, the lens CPU 102 enables the DC-DC output of the power circuit unit 106 and causes the power circuit unit 106 to supply power to the driver IC 128 through the DC-DC output.

In a case where the linear output (output by amplifier) format is set, the flow in FIG. 3 can efficiently reduce the voltage using the DC-DC output to the maximum power required for the output. Since there is a power loss even if the voltage is stepped down by the DC-DC output, in a case where the PWM output method is set, directly supplying power to the driver IC 128 enables the PWM control to efficiently use power. Therefore, efficient power supply is available for each output method of the driver IC 128.

Figure 4:
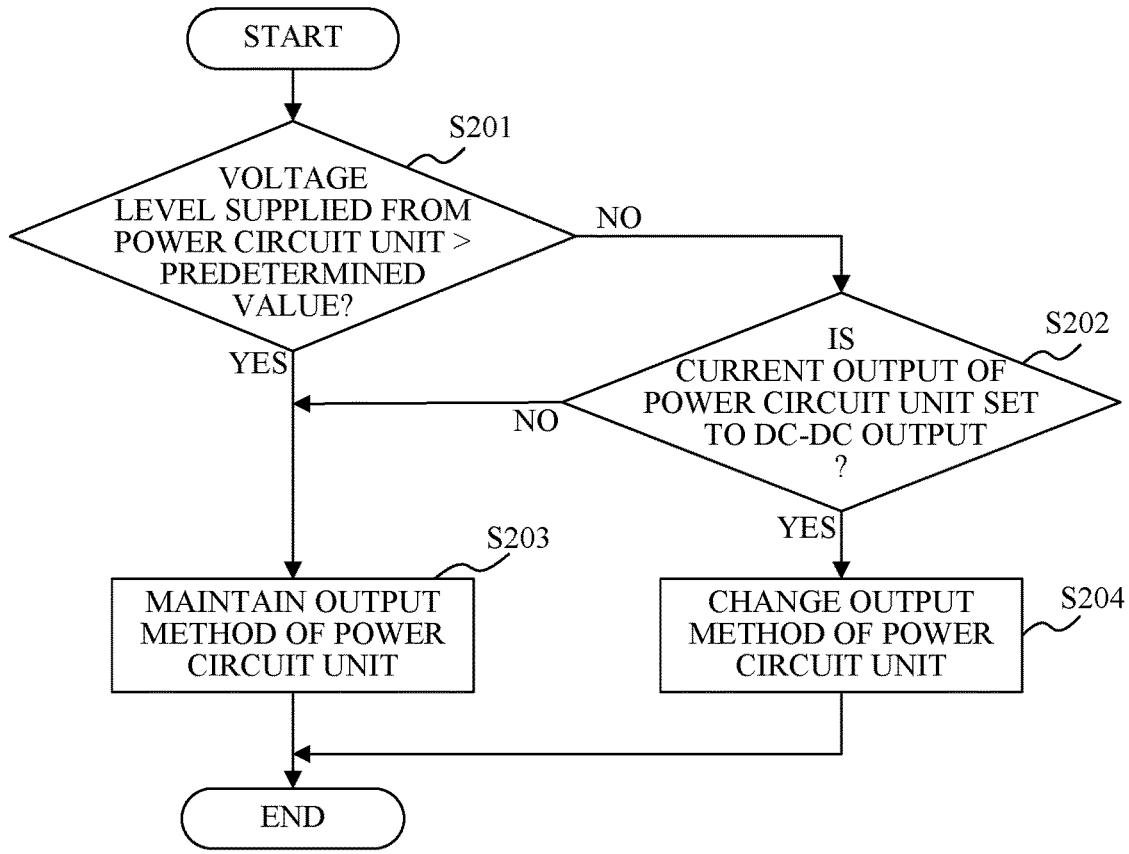
FIG. 4 is a flowchart illustrating another example of power setting processing.

FIG. 4 is a flowchart illustrating another example of power setting processing.

In step S201, the lens CPU 102 determines whether the voltage level supplied from the power circuit unit 155 detected by the AD converter 141 is higher than a predetermined value. In a case where the lens CPU 102 determines that the voltage level is higher than the predetermined value, the flow proceeds to step S203; otherwise (in a case where the voltage level is less than the predetermined value), the flow proceeds to step S202. In a case where the voltage level is equal to the predetermined value, the flow may proceed to any one of them.

In step S202, the lens CPU 102 determines whether the current output of the power circuit unit 106 is set to the DC-DC output. In a case where the output of the power circuit unit 106 is set to the DC-DC output, the flow proceeds to step S204; otherwise, the flow proceeds to step S203.

In step S203, the lens CPU 102 maintains (does not change) the output method of the power circuit unit 106.

In step S204, the lens CPU 102 changes the output of the power circuit unit 106 from the DC-DC output to an output method in which the power supplied from the power circuit unit 155 is supplied to the driver IC 128 as it is.

Figure 5:
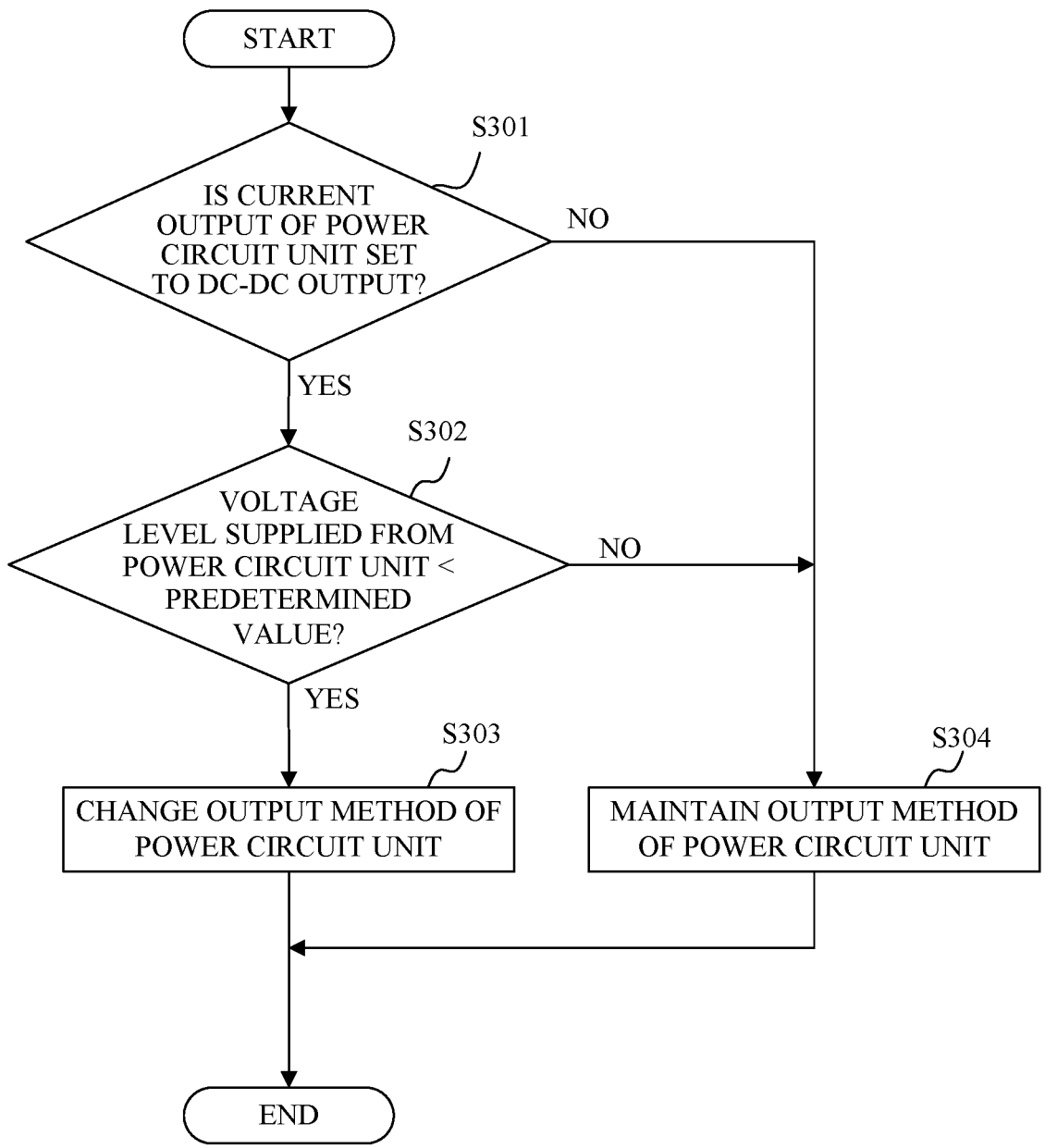
FIG. 5 is a flowchart illustrating another example of power setting processing.

As illustrated in FIG. 5, the order of processing steps S201 and S202 in FIG. 4 may be reversed. In FIG. 5, in step S301, the lens CPU 102 determines whether the current output of the power circuit unit 106 is set to the DC-DC output. In a case where the output of the power circuit unit 106 is set to the DC-DC output, the flow proceeds to step S302; otherwise, the flow proceeds to step S304. In step S302, the lens CPU 102 determines whether the voltage level supplied from the power circuit unit 155 detected by the AD converter 141 is lower than a predetermined value. In a case where the lens CPU 102 determines that the voltage level is lower than the predetermined value, the flow proceeds to step S303; otherwise (in a case where the voltage level is higher than the predetermined value), the flow proceeds to step S304. In a case where the voltage level is equal to the predetermined value, the flow may proceed to any one of them. In step S303, the lens CPU 102 changes the output method of the power circuit unit 106 from the DC-DC output to the output method in which the power supplied from the power circuit unit 155 is supplied to the driver IC 128 as it is. In step S304, the lens CPU 102 maintains (does not change) the output method of the power circuit unit 106.

By executing the flow of FIG. 4 or 5, in a case where the voltage level supplied from the power circuit unit 155 is lower than the predetermined value and the power supply output method is the DC-DC output, a difference between input and output potentials reduces, the efficiency decreases, and power loss can be avoided. In addition, the reduced difference between input and output potentials can suppress noises caused by the DC-DC control such as a change in the DC-DC switching period and switching skips.

Figure 6:
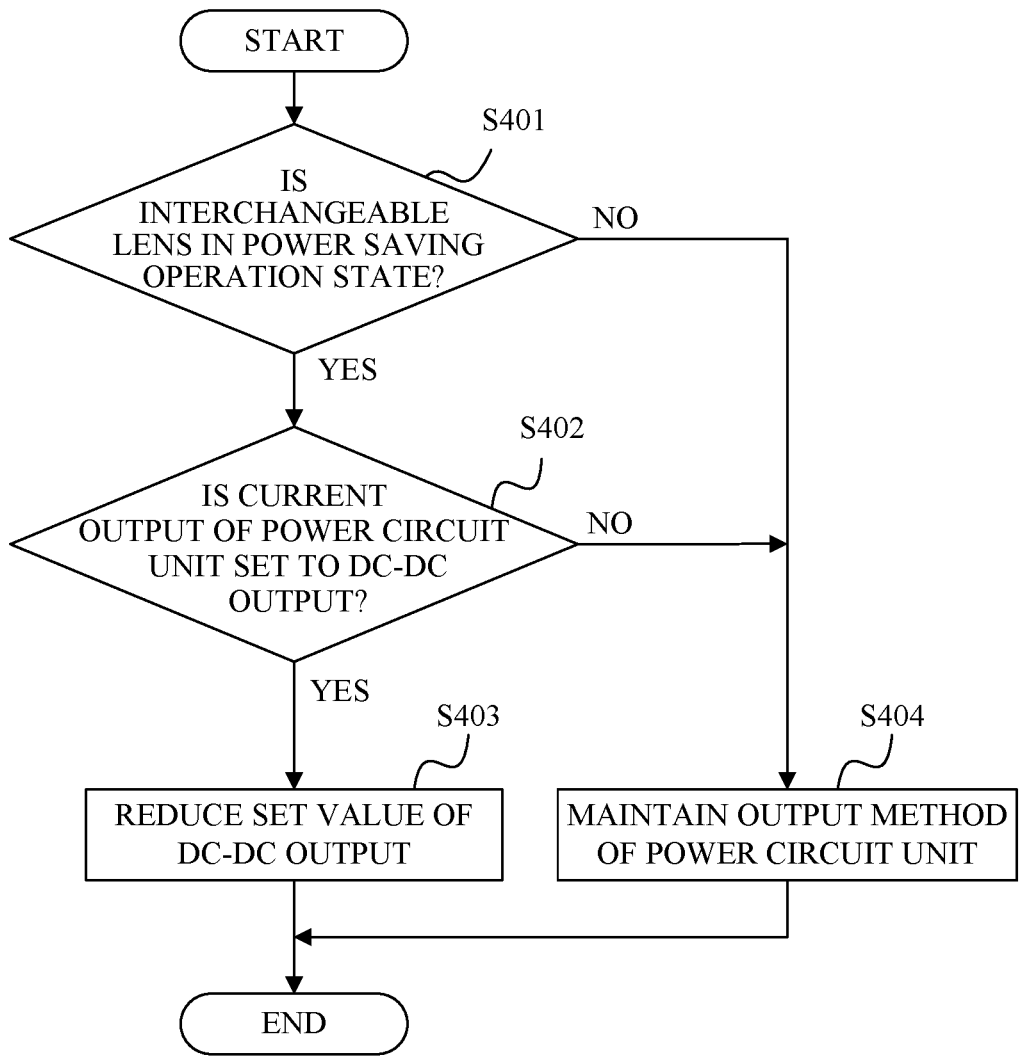
FIG. 6 is a flowchart illustrating another example of power setting processing.

FIG. 6 is a flowchart illustrating another example of power supply setting.

In step S401, the lens CPU 102 determines whether the interchangeable lens 101 is in the power saving operation state. The power saving operation state is set, for example, in a case where each actuator of the interchangeable lens 101 is not operated for a certain period of time due to long-exposure imaging, or in a case where the power consumption of the camera system 100 as a whole is large due to attachment of an accessory, or the like. The power saving operation state is also set in a case where the image stabilizing operation is turned off and the image stabilizing lens 110 is held at the center of the optical axis, or in a case where the aperture stop 109 is held at a predetermined aperture. The power saving operation state is also set in a case where the power saving of the focus lens 107 is maintained. In a case where the lens CPU 102 determines that the actuator 129 is in the power saving operation state, the flow proceeds to step S402; otherwise, the flow proceeds to step S404.

In step S402, the lens CPU 102 determines whether the current output of the power circuit unit 106 is set to the DC-DC output. In a case where the output of the power circuit unit 106 is set to the DC-DC output, the flow proceeds to step S403; otherwise, the flow proceeds to step S404.

In step S403, the lens CPU 102 lowers the set value of the DC-DC output. That is, the lens CPU 102 causes the power circuit unit 106 to output a third power having a voltage different from (lower than in this embodiment) the second power.

In step S404, the lens CPU 102 maintains (does not change) the output method of the power circuit unit 106.

Figure 7:
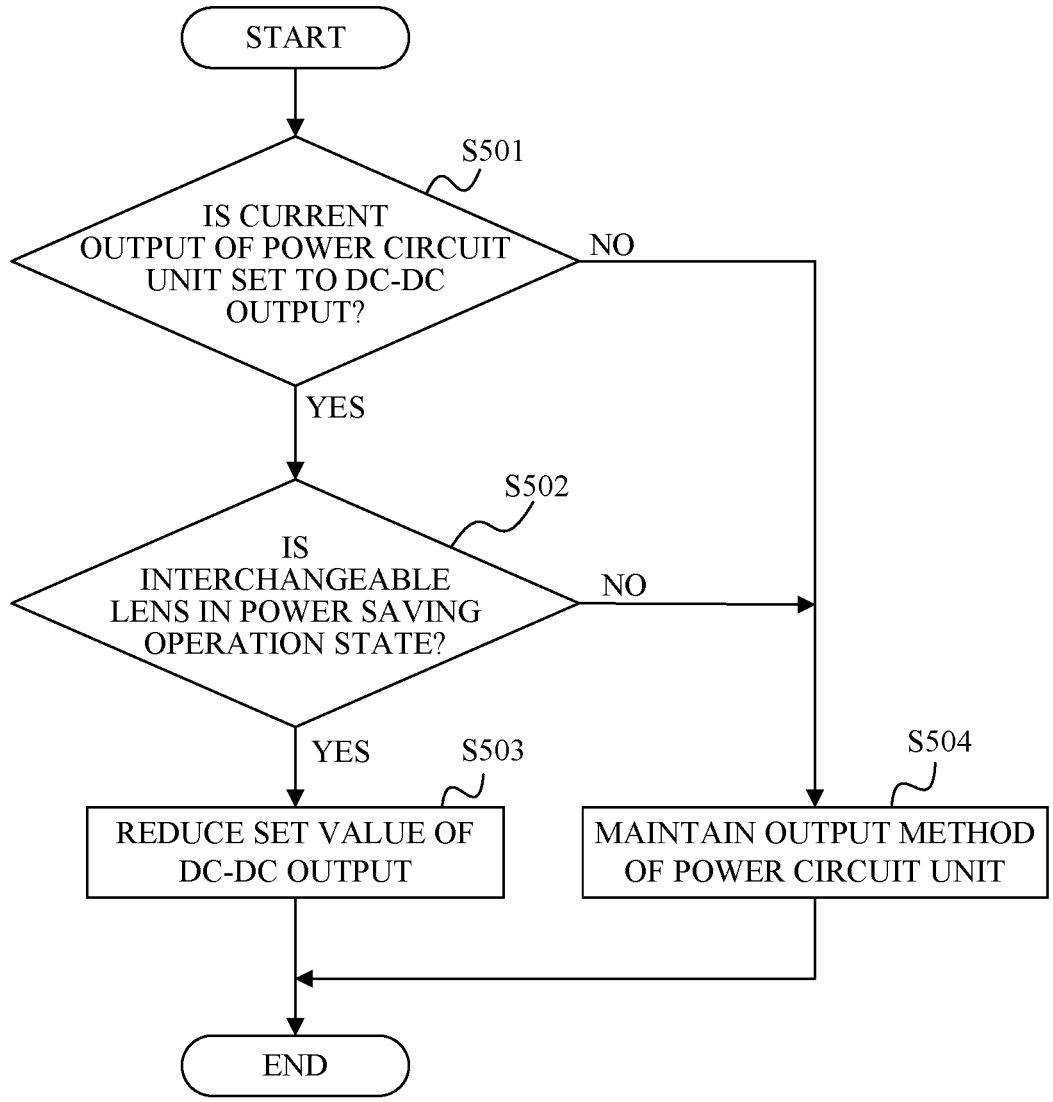
FIG. 7 is a flowchart illustrating another example of power setting processing.

As illustrated in FIG. 7, the order of processing steps S401 and S402 in FIG. 6 may be reversed. In FIG. 7, in step S501, the lens CPU 102 determines whether the current output of the power circuit unit 106 is set to the DC-DC output. In a case where the output of the power circuit unit 106 is set to the DC-DC output, the flow proceeds to step S502; otherwise, the flow proceeds to step S504. In step S502, the lens CPU 102 determines whether the actuator 129 is in the power saving operation state. In a case where the lens CPU 102 determines that the actuator 129 is in the power saving operation state, the flow proceeds to step S503; otherwise, the flow proceeds to step S504. In step S503, the lens CPU 102 decreases the DC-DC output setting value. In step S504, the lens CPU 102 maintains (does not change) the output method of the power circuit unit 106.

By executing the flow of FIG. 6 or 7, in a case where the voltage level required for actuator operation changes, the power can be efficiently reduced to the required level by the DC-DC output, and the power efficiency can be improved.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

This embodiment can provide a control apparatus, a lens apparatus, an image pickup apparatus, a control method, and a storage medium, each of which can suppress the influence of noise without reducing the power efficiency.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-129454, filed on Aug. 16, 2022, which is hereby incorporated by reference herein in its entirety.

What is claimed is:

1. A control apparatus for a camera system that includes an image pickup apparatus and a lens apparatus including a driven unit, an output unit that is supplied with power from the image pickup apparatus and outputs power that is used to move the driven unit, and an actuator configured to move the driven unit, the control apparatus comprising:
   a driving unit configured to drive the actuator by a PWM output method or a linear output method using the power from the output unit; and
   a control unit configured to control an output of the power from the output unit to the driven unit,
   wherein the control unit causes the output unit to output a first power in a case where the driving unit drives the actuator by the PWM output method, and in a case where the driving unit drives the actuator by the linear output method, the control unit causes the output unit to output a second power different from the first power, and
   wherein in a case where the output unit outputs the second power and the lens apparatus is in a specific state, the control unit causes the output unit to output a third power having a voltage different from a voltage of the second power to the output unit.

2. The control apparatus according to claim 1, wherein the first power is the power supplied from the image pickup apparatus, and
   wherein the second power is power with a voltage different from the voltage of the power supplied from the image pickup apparatus.

3. The control apparatus according to claim 2, wherein the output unit includes a DC-DC circuit, and wherein the second power is power output from the DC-DC circuit to which the power supplied from the image pickup apparatus is input.

4. The control apparatus according to claim 1, further comprising a detector configured to detect a voltage level supplied from the image pickup apparatus to the output unit, and wherein the control unit causes the output unit to output the first power in a case where the output unit outputs the second power and the voltage level is lower than a predetermined value.

5. A lens apparatus comprising:
the control apparatus according to claim 1;
a driven unit;
an output unit supplied with power from the image pickup apparatus and configured to output power that is used to move the driven unit; and
an actuator configured to move the driven unit.

6. An image pickup apparatus comprising:
the control apparatus according to claim 1; and
an image sensor.

7. A control method for a camera system that includes an image pickup apparatus and a lens apparatus including a driven unit, an output unit that is supplied with power from the image pickup apparatus and outputs power that is used to move the driven unit, and a driving unit for driving an actuator, the actuator being configured to move the driven unit, the control method comprising the steps of:

driving, by the driving unit, the actuator by a PWM output method or a linear output method using the power from the output unit; and causing the output unit to output a first power in a case where the driving unit drives the actuator by the PWM output method, and in a case where the driving unit drives the actuator by the linear output method, causing the output unit to output a second power different from the first power, wherein in a case where the output unit outputs the second power and the lens apparatus is in a specific state, the output unit is caused to output a third power having a voltage different from a voltage of the second power to the output unit.

8. A non-transitory computer-readable medium storing a program that causes a computer to execute the control method according to claim 7.

* * * * *